United States Patent [19]

Kline et al.

[11] Patent Number: 4,548,859

[45] Date of Patent: Oct. 22, 1985

[54] BREATHER MATERIAL AND METHOD OF COATING FABRIC WITH SILICONE RUBBER

[75] Inventors: William T. Kline, Seattle; Robert F. Mittelstadt, Auburn, both of Wash.

[73] Assignee: The Boeing Company, Seattle, Wash.

[21] Appl. No.: 660,375

[22] Filed: Oct. 12, 1984

[51] Int. Cl.$^4$ .............................................. B32B 7/00
[52] U.S. Cl. .................................. 428/251; 427/243; 427/296; 427/387; 427/407.3; 427/412; 428/230; 428/247; 428/253; 428/254; 428/447
[58] Field of Search ............... 428/230, 247, 251, 253, 428/254, 447; 427/243, 296, 387, 407.3, 412

[56] References Cited

U.S. PATENT DOCUMENTS

| | | | |
|---|---|---|---|
| 19,494 | 3/1935 | Glidden et al. | 154/2 |
| 2,983,570 | 5/1961 | Lux | 18/47 |
| 3,215,574 | 11/1965 | Korb | 156/3 |
| 3,232,819 | 2/1966 | Satas | 161/72 |
| 3,311,520 | 3/1967 | Michaelson et al. | 156/209 |
| 3,373,068 | 3/1968 | Grosheim et al. | 156/219 |
| 3,418,180 | 12/1968 | Grosheim | 156/277 |
| 3,485,706 | 12/1969 | Evans | 161/72 |
| 3,666,600 | 5/1972 | Yoshino | 156/382 |
| 3,723,220 | 3/1973 | Scher et al. | 156/219 |
| 4,062,917 | 12/1977 | Hill et al. | 264/102 |
| 4,216,047 | 8/1980 | Hilliard et al. | 156/285 |
| 4,353,855 | 10/1982 | Garabedian | 264/126 |
| 4,500,584 | 2/1985 | Modic | 428/253 |

FOREIGN PATENT DOCUMENTS 53-094693  8/1978  Japan .

Primary Examiner—Marion E. McCamish
Attorney, Agent, or Firm—Joan H. Pauly

[57] ABSTRACT

In vacuum bagging and similar operations involving composite materials, it is necessary to provide both a release layer that directly contacts the composite material and will not adhere to such material, and passages for removing entrapped air. A problem with known release layers is that they are not sufficiently stretchable to provide uniform contact with complex or sharply bending surface configurations. The invention provides a breather/release material (6). Material (6) includes a flexible, stretchable foraminous fabric (10) that has a ribbed major surface (16). A foraminous coating (20) of silicone rubber release compound is formed on fabric (10) by a shrink drying process. Coating (20) conforms to the ribbed configuration of surface (16) and has holes (24) generally coinciding with holes (12) in fabric (10). Ribbed surface (16) may be bonded to an impervious layer (4) with an adhesive (8). Passageways (26) formed by ribs (14) of surface (16) and holes (12, 24) are kept open by limiting the amount of adhesive (8) used.

22 Claims, 21 Drawing Figures

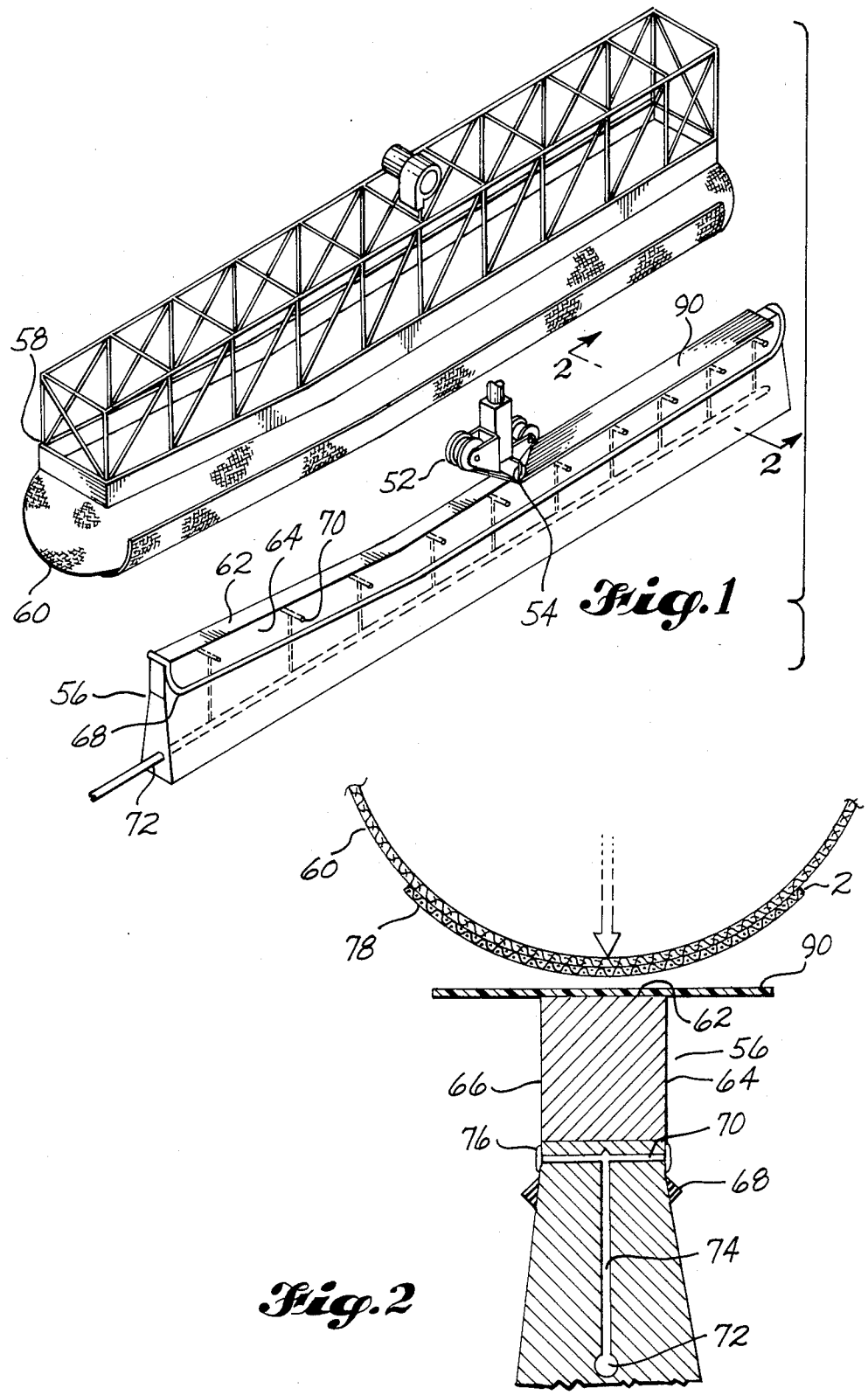

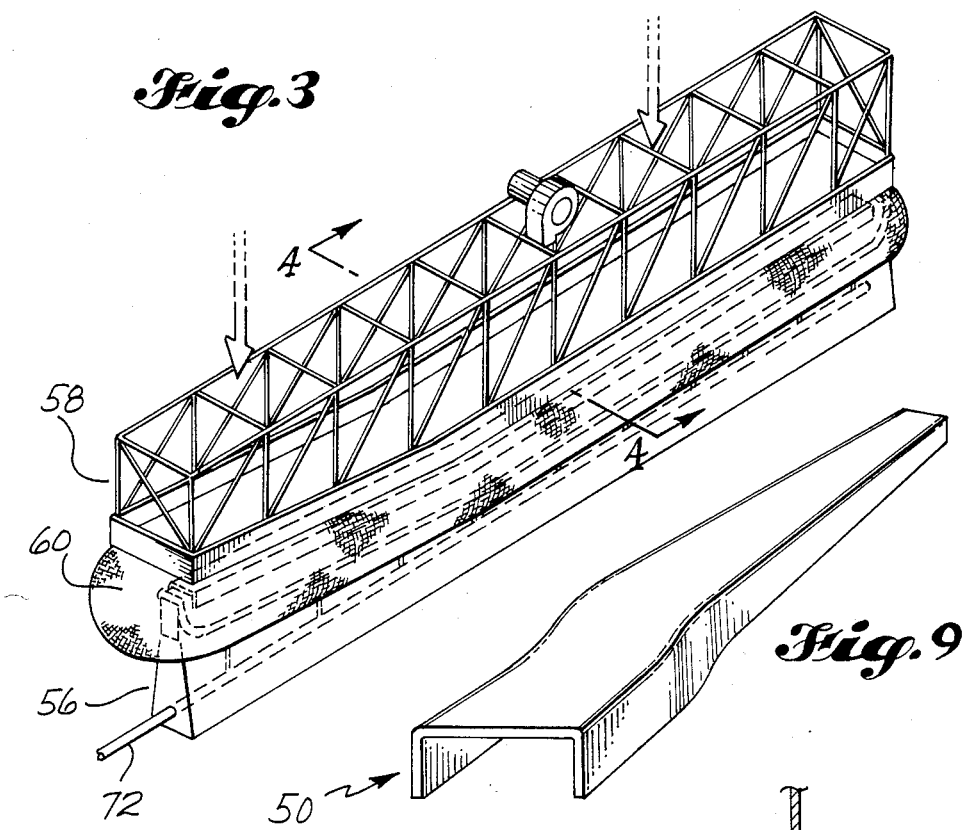
Fig. 3
Fig. 9
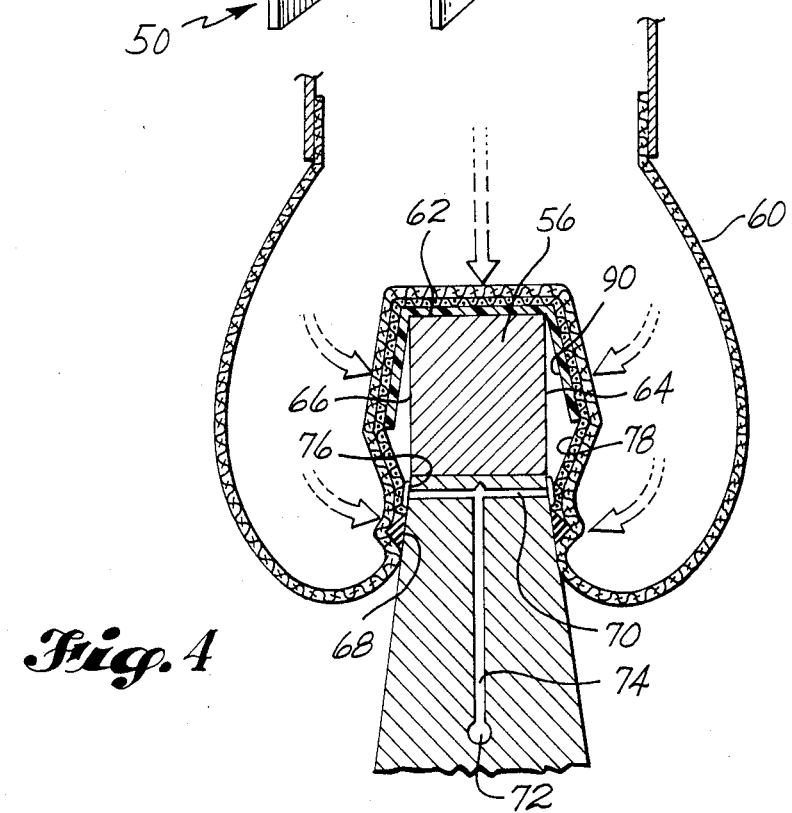
Fig. 4

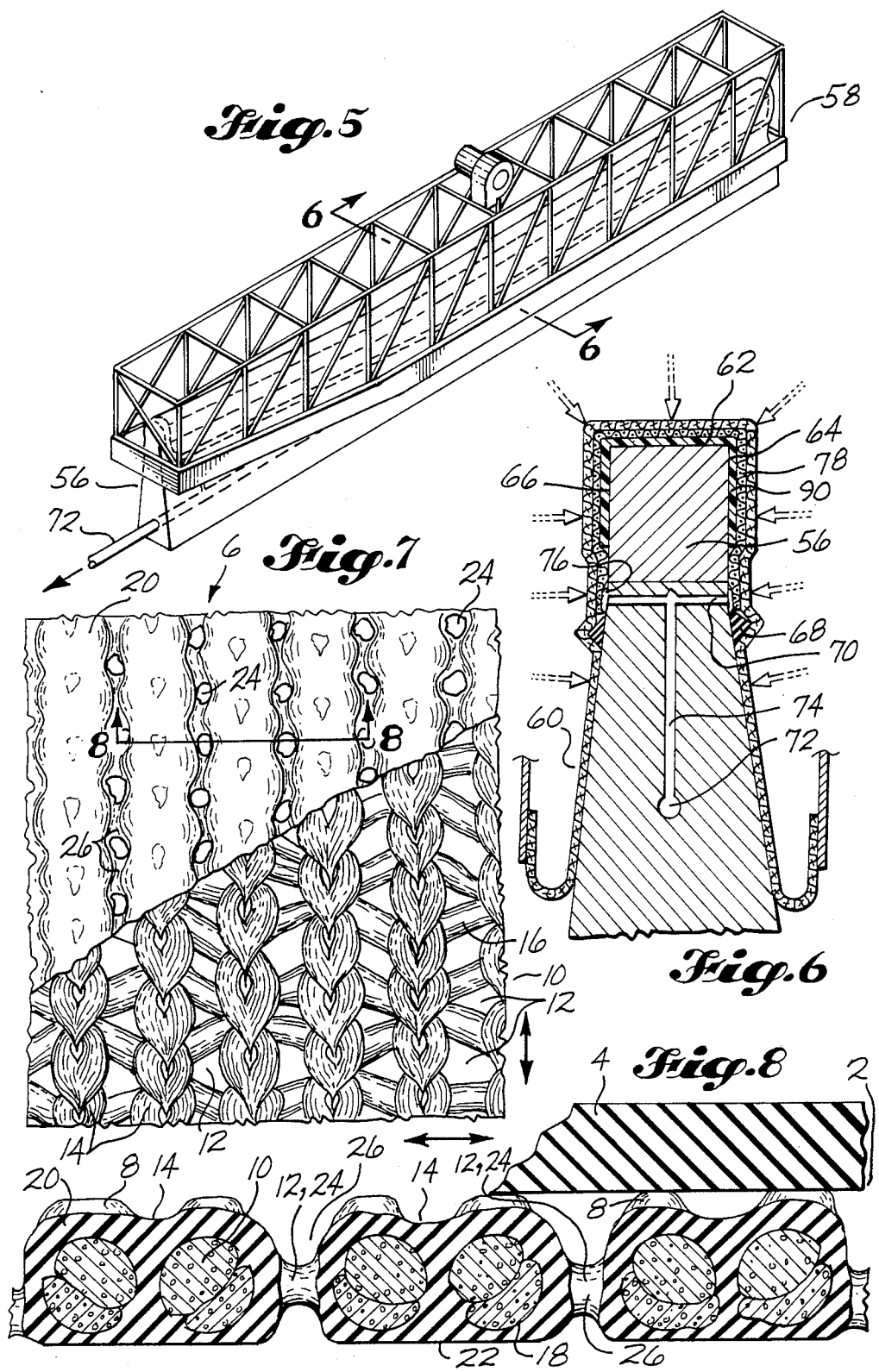

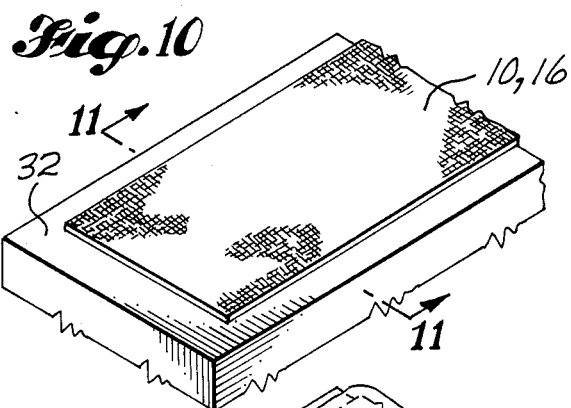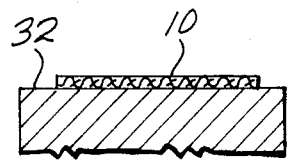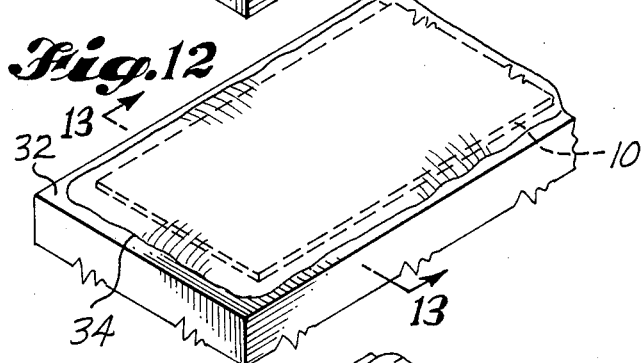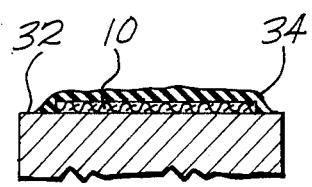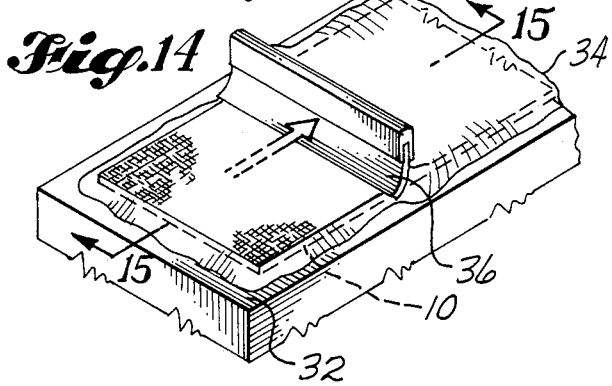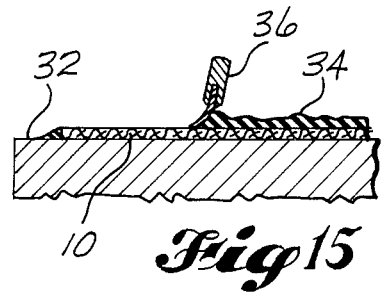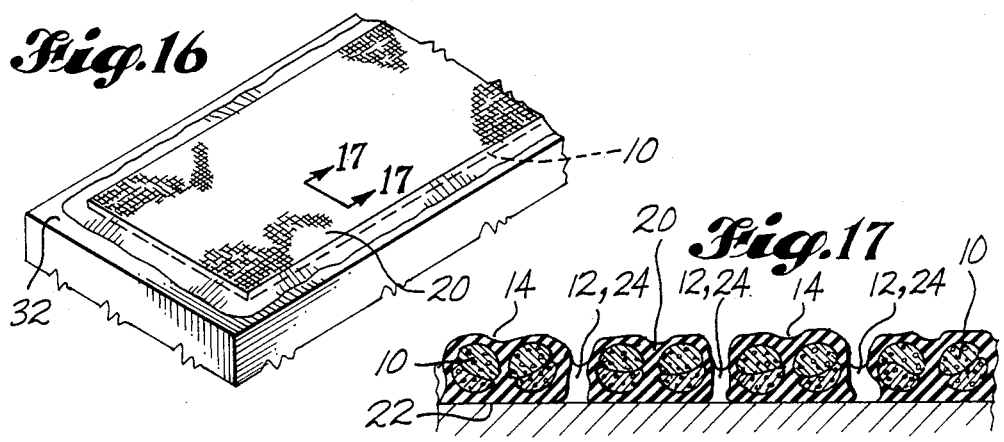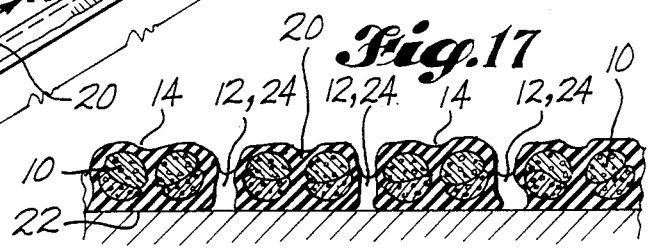

BREATHER MATERIAL AND METHOD OF COATING FABRIC WITH SILICONE RUBBER

DESCRIPTION

1. Technical Field

This invention relates to sheet materials for providing vacuum passageways and to methods of making the same, and more particularly, to such materials in which a ribbed surface of and holes through a layer of breather material provide the passageways and in which the breather material is formed by shrink drying a silicone rubber release compound on a stretchable ribbed fabric.

2. Background Art

In the manufacture of aircraft components and the like from fiber reinforced composite materials, the use of vacuum bagging techniques in the curing and/or compaction steps is well-known. It is also well-known that surfaces that come directly into contact with the composite material in vacuum bagging procedures must be nonadherent to the composite material and should not be subject to damage or deterioration caused by contact with the composite material. The surfaces also need to provide air passageways for a vacuum and good contact with the composite material so that, during the vacuum bagging operation, the pressure on the composite material will be substantially uniform.

Most known materials used as a release (nonadherent) layer in vacuum bagging operations include a coating of polytetrafluoroethylene (PTFE) or fluorinated ethylene-propylene (FEP) to provide the characteristics of nonadherence and resistance to damage or deterioration caused by contact with the resins of the composite material. A major problem associated with the use of PTFE and FEP coatings is that these materials are not stretchable. This lack of stretchability results in an impairment of the uniformity of contact between the release layer and the composite material because of a tendency for the release layer to buckle or distort and to form bridges or areas of no contact. This impaired uniformity of contact in turn results in nonuniform compaction of the composite material and a consequent lowering of the overall quality of the finished product.

U.S. Pat. No. 3,666,600, granted May 30, 1972, to S. Y. Yoshino, and U.S. Pat. No. 4,062,917, granted Dec. 13, 1977, to T. B. Hill et al each disclose a vacuum bagging operation that includes the use of a release layer. Yoshino discloses a release layer made from materials such as a glass fabric coated with PTFE. Hill et al do not disclose any particular composition for the release layer but rather refer to the use of a variety of known commercially available materials. U.S. Pat. No. 4,216,047, granted Aug. 5, 1980, to L. G. Hilliard et al discloses a vacuum bagging process in which an impervious film of a material such as PTFE is placed between the vacuum bag and the composite material. An edge breather strip is provided around the periphery of and spaced from the lay-up of composite material. A strand of glass fibers provides communication between the composite material and the breather strip.

U.S. Pat. No. 4,353,855, granted Oct. 12, 1982, to A. Garabedian discloses a molding process in which plastic particles are placed in a female mold and are formed into an article using heat and pressure. During the molding process, a flexible diaphragm is placed over the top of the female mold. An air release layer is placed between the flexible diaphragm and the plastic particles to permit the escape of any entrapped gases. The air release layer includes a microporous sheet of a material such as fiberglass coated with PTFE. A finely woven wire cloth or screen is positioned over the microporous release sheet.

U.S. Pat. No. 2,983,570, granted May 9, 1961, to B. Lux discloses a porous mold surface impregnated with an anti-adhesive plastic. This mold surface is made by impregnating a porous metallic mold surface with a plastic material such as PTFE or a solid silicon resin. The plastic material is applied to the metallic mold in a state of solution or dispersion, by dipping, spreading, spraying, or other known methods.

The patent literature also includes a number of examples of textiles and similar fabrics that are stretchable and methods of making such fabrics. U.S. Pat. Nos. Re. 19,494, reissued on Mar. 12, 1935, to A. A. Glidden et al, and 3,232,819, granted Feb. 1, 1966, to D. Satas each disclose stretchable porous fabrics for use in the manufacture of apparel. Glidden et al disclose a ventilated fabric including a perforated rubber layer with cloth face sheets made from a knitted fabric. The Satas patent describes the manufacture of porous artificial leather made from sprays of filaments and particles of polymers. A fabric, such as an elastic fabric, may be embedded on one face of the artificial leather. U.S. Pat. No. 3,485,706, granted Dec. 23, 1969, to F. J. Evans discloses textile-like nonwoven fabrics and their method of manufacture. In the manufacture of the fabrics, high energy liquid streams are used to form patterns of entangled fiber regions and interconnecting fibers. It appears that at least some of the fabrics may be stretchable. Japanese Patent Document No. 53/094-693, dated Aug. 18, 1978 and in the name of Toshiba Silicone KK discloses an antislip material for clothing. The material is made by coating an elastic cloth with a silicone rubber compound and pressing the coated cloth with a roller while it is in an uncured or semicured state. Upon curing, a thin rough-surface coating is formed on the fabric. It appears that the resulting antislip material is at least somewhat stretchable, but there is no indication that it has any porosity or any release properties relative to composite materials.

Release sheets are also used in a number of known processes for manufacturing laminates with textured surfaces. U.S. Pat. Nos. 3,311,520, granted Mar. 28, 1967, to J. Michaelson et al, 3,373,068, granted Mar. 12, 1968, to G. E. Grosheim et al, 3,418,189, granted Dec. 24, 1968, to G. E. Grosheim, and 3,723,220, granted Mar. 27, 1973, to H. I. Scher et al each disclose such a process.

U.S. Pat. No. 3,215,574, granted Nov. 2, 1965, to R. W. Korb discloses a method of making thin flexible plastic-sealed printed circuits. The method includes impregnating a glass cloth with a nonliquifiable plastic such as PTFE and sealing it to a liquifiable layer so that the glass cloth may be peeled off the finished product. The presence of the glass cloth on the circuit during the manufacturing process provides dimensional stability because it restrains shrinkage.

The above patents and the prior art that is discussed and/or cited therein should be studied for the purpose of putting the present invention into proper perspective relative to the prior art.

DISCLOSURE OF THE INVENTION

A subject of this invention is breather material for use between an impervious layer and a workpiece in a system in which a vacuum is applied between such layer and the workpiece to cause the impervious layer to exert substantially uniform pressure on the workpiece. According to an aspect of the invention, the breather material comprises a flexible fabric and a coating of silicone rubber release compound. The fabric has opposite major faces at least one of which is ribbed. A plurality of holes extends through the fabric between the major faces. These holes are spaced over essentially the entire extent of the faces. The fabric is stretchable in its general plane in at least two directions, which directions are substantially perpendicular to each other. The coating of release compound on the fabric covers at least the face opposite the ribbed face. The coating has a plurality of holes extending therethrough, and these holes generally coincide with the holes in the fabric. Any portions of the coating on the ribbed face substantially conform to the configuration of the ribbed face. The holes in the coating and the conformation to the ribbed configuration provide passageways for a vacuum when the breather material is pressed between the impervious layer and the workpiece. The release compound is flexible, stretchable, nonadherent to the workpiece, and not subject to damage or deterioration caused by contact with the workpiece.

A preferred feature of the invention is an outer surface of the coating on the face opposite the ribbed face which, disregarding the holes in the coating, is essentially flat and smooth to form a contact surface for pressing substantially uniformly against the workpiece. Another preferred feature is a fabric that includes polyester fibers arranged in a ribbed knit configuration. Still another preferred feature is a release compound that is not adherent to an epoxy resin matrix and that is not subject to damage or deterioration caused by contact with such a matrix.

Another subject of the invention is sheet material for exerting substantially uniform pressure on a workpiece when a vacuum is applied between the sheet material and the workpiece. According to an aspect of the invention, the sheet material includes a layer of breather material having the same basic characteristics of the breather material described above. The sheet material also includes a layer of flexible, stretchable impervious material adjacent to the ribbed face of the breather material. An adhesive is provided between the impervious material and the ribbed face in an amount sufficient to firmly bond the ribbed face to the impervious material but insufficient to block the passageways. Preferably, the impervious material comprises flexible, stretchable silicone rubber.

Another subject of the invention is a method of making foraminous sheet material having a ribbed major surface. According to an aspect of the invention, the method comprises laying a foraminous ribbed fabric on a horizontal surface of material that will not adhere to silicone rubber release compound, and facing a ribbed major surface of the fabric upwardly. Liquid silicone rubber release compound is thinned with a volatile solvent in an amount sufficient to cause shrinkage of the compound of about 50% in volume upon drying of the compound. A puddle of the thinned compound is formed. The puddle covers the fabric and is substantially flush with the top of the upwardly facing major surface of the fabric. The puddle of compound is allowed to dry to form a coating on the fabric, and the compound is allowed to shrink as it drys to conform the coating to the ribbed configuration of the upwardly facing major surface and to allow holes through the coating to form where there are holes through the fabric. Preferably, the step of forming a puddle comprises pouring the thinned compound over the fabric to form a puddle of compound that covers the fabric, and sweeping excess compound off the fabric to make the top of the puddle substantially flush with the top of the fabric.

In the preferred embodiment of the method, the fabric is laid on a horizontal surface that is essentially flat. When the puddle is allowed to dry and the compound is allowed to shrink, the coating on the downwardly facing major surface is allowed to conform to the essentially flat horizontal surface to form, disregarding the holes through the coating, an essentially flat and smooth surface.

Still another subject of the invention is a method of making flexible, stretchable sheet material having an impervious layer, a foraminous layer, and passageways between such layers. These passageways communicate with holes in the foraminous layer and with edge portions of the material. According to an aspect of the invention, the method comprises laying a flexible, stretchable foraminous ribbed fabric on a horizontal surface of a material that will not adhere to silicone rubber release compound, and facing a ribbed major surface of the fabric upwardly. Liquid silicone rubber release compound is thinned as described above, and a puddle of the thinned compound is formed. The puddle covers the fabric and is substantially flush with the top of the upwardly facing major surface of the fabric. The puddle is allowed to dry and the compound is allowed to shrink to conform the coating to the ribbed configuration and to allow holes through the coating to form, as described above. Then, the ribbed major surface is bonded to a sheet of flexible, stretchable impervious material. The bonding is accomplished by applying an adhesive in an amount sufficient to create a firm bond but insufficient to block passageways formed by the ribbed configuration and the holes through the fabric and the coating.

The bonding step may be carried out in a number of ways. In the preferred embodiment of the method, the bonding step includes positioning the coated fabric against an essentially flat surface with the ribbed major surface facing outwardly from such flat surface. The adhesive is applied to a cylindrical surface, and the cylindrical surface is rolled across the outwardly facing ribbed surface to transfer the adhesive from the cylindrical surface to outer ridge portions of the ribbed surface. The sheet of impervious material is positioned adjacent to the ribbed surface and the adhesive thereon. The ribbed surface and the sheet of impervious material are pressed together to form the firm bond.

Preferably, peripheral portions of the flat surface are provided with a plastic film. When the sheet of impervious material is positioned, the edges of the sheet are brought into contact with the film. The ribbed surface and the sheet of impervious material are pressed together by applying a vacuum between the sheet and the flat surface, and allowing the edges of the sheet to sealingly engage the film. Preferably, the vacuum and the sealing engagement between the sheet and the film are maintained for a period of time sufficient to allow the adhesive to cure. This helps to ensure a firm bond between the ribbed surface and the impervious material.

Yet another subject of the invention is sheet material having a ribbed major surface. According to an aspect of the invention, the sheet material comprises a fabric that has opposite major surfaces, at least one of which is ribbed, and a plurality of holes extending therethrough between such faces. The sheet material also includes a foraminous coating of silicone rubber release compound formed on the fabric by allowing the compound to dry and shrink, to conform to the configuration of the ribbed face and to form a plurality of holes extending through the coating and generally coinciding with the holes in the fabric.

A feature of the invention is such sheet material that further comprises a layer of impervious material adjacent to the ribbed face. An adhesive is provided between the impervious material and the ribbed face in an amount sufficient to firmly bond the ribbed face to the impervious material but insufficient to block the passageways formed by the configuration of the ribbed face and the holes through the fabric and the coating.

The breather material of the present invention is particularly well suited for use with fiber reinforced composite materials in vacuum bagging and similar operations. The coating of silicone rubber release compound makes the breather materials suitable for use as a release layer since the release compound does not adhere to composite material and it is not subject to damage or deterioration caused by contact with such material. In addition, the ribbed configuration of the fabric and the coating thereon and the holes through the fabric and the coating provide a network of passageways that make it possible to apply a vacuum substantially uniformly, to in turn apply pressure substantially uniformly on the composite material as the composite material is being compacted. When the breather material is combined with a layer of impervious material to which it is bonded, the resulting sheet material provides a single relatively inexpensive and reusable sheet material for compacting composite material in a vacuum bagging or similar operation.

The breather material and combination sheet material of the invention solve the problems discussed above in relation to impaired uniformity of contact caused by a lack of stretchability of a release layer. The stretchability of the materials of the invention allow such materials to take the form of the composite material lay-up being compacted. Areas of complex curvature and sharp bends are no problem. There is no tendency to buckle or distort or to form bridges. The result is a more uniform and complete compaction of the composite material and a consequent improvement of the overall quality of the finished product. In the preferred embodiment of the materials of the invention, in which the face of the breather material opposite the ribbed face is essentially flat and smooth, the uniformity of contact with the composite material is maximized.

The present invention also provides methods for manufacturing such breather materials and combination sheet materials. The methods of the invention are relatively easy and inexpensive to carry out. The economic advantages of the methods include a requirement for only a minimal amount of labor and a lack of a need for any expensive specialized equipment.

These and other advantages and features will become apparent from the following detailed description of the best modes for carrying out the invention.

BRIEF DESCRIPTION OF THE DRAWINGS

In the drawings, like element designations refer to like parts throughout, and:

FIG. 1 is a pictorial view of part of an installation into which the preferred embodiment of the material of the invention is incorporated.

FIG. 2 is a sectional view taken along the line 2—2 in FIG. 1.

FIG. 3 is a pictorial view of the installation shown in FIG. 1 at a different stage of the operation.

FIG. 4 is a sectional view taken the line 4—4 in FIG. 3.

FIG. 5 is a pictorial view showing the installation shown in FIGS. 1 and 3 in still another stage of the operation.

FIG. 6 is a sectional view taken along the line 6—6 in FIG. 5.

FIG. 7 is a top plan view of the preferred embodiment of the breather material of the invention, with a portion of the coating removed to show the weave of the fabric.

FIG. 8 is a sectional view taken along the line 8—8 in FIG. 7, with adhesive and a portion of an impervious layer added.

FIG. 9 is a pictorial view of a channel stringer of the type manufactured in the installation shown in FIGS. 1-6.

FIGS. 10-21 illustrate the preferred embodiment of the method of manufacturing the breather material and bonding it to an impervious layer, with FIGS. 10, 12, 14, 16, 18, and 20 being pictorial views and FIGS. 11, 13, 15, 17, 19, and 21 being sectional views corresponding to these pictorial views.

BEST MODES FOR CARRYING OUT THE INVENTION

Figure 18:
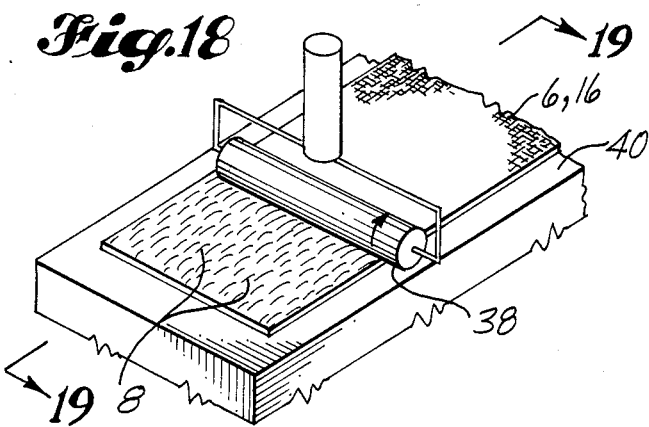

The drawings show sheet material 2 (including a breather layer and an impervious layer) and breather material 6 that are made according to the invention and that also constitute the best modes of the material of the invention currently known to the applicant. The drawings also illustrate the best modes for carrying out the methods of the invention currently known in the applicant. FIGS. 1-6 show relevant parts of an installation for forming composite material articles. The illustrated installation is designed for use in the forming of elongated channel stringers such as the stringer 50 shown in FIG. 9. The installation shown in FIGS. 1-6 is the subject of a copending application of one of the present applicants, Robert F. Mittelstadt, and George R. Stumpf, Jr., entitled Method and Apparatus for Forming Composite Material Articles, filed on Dec. 23, 1983. The installation does not form a part of the present invention and is shown and described herein solely for the purpose of illustrating a use environment for the materials of the present invention. It is anticipated that one of the primary uses of the materials of the invention will be in an installation such as that shown in FIGS. 1-6. However, it is of course to be understood that the materials of the invention may also be used to great advantage in other installations and operations in which it is necessary to provide a substantially uniform pressure on a workpiece.

The preferred embodiment of the breather material 6 of the invention includes a flexible fabric 10 and a coating 20 of silicone rubber release compound on the fabric 10. One of the opposite major faces 16, 18 of the fabric 10 has a ribbed configuration. This ribbed face 16 has a series of generally parallel ribs or ridges 14 extending along its surface. The fabric 10 also has a plurality of holes 12 extending through it between its faces 16, 18.

These holes 12 are spaced over the entire extent of the faces 16, 18. (See FIG. 7).

The fabric 10 is stretchable in its general plane in at least two directions. These directions are substantially perpendicular to each other. The two headed arrows in FIG. 7 illustrate the primary directions of stretch of the fabric of the preferred embodiment. The fabric 10 shown in the drawings is a lightweight specialty knit weave. The preferred material for the fabric 10 is polyester. Of course, it is to understood that fabrics with other weaves and made from other materials may also be used without departing from the spirit and scope of the invention.

The coating 20 on the fabric 10 covers at least the face 18 opposite the ribbed face 16, and in the preferred embodiment covers both faces 16, 18. (See FIGS. 7 and 8.) The coating 20 has a number of holes 24 extending therethrough. These holes 24 generally coincide with the holes 12 in the fabric 10. The portions of the coating 20 on the ribbed face 16 of the fabric 10 substantially conform to the ribbed configuration of such ribbed face 16. This combination of a foraminous ribbed fabric 10 and a coating 20 that conforms to the foraminous ribbed configuration of the fabric 10 provides a ribbed breather material 6 with passageways 26 for a vacuum. When the breather material 6 is pressed between an impervious material and a workpiece, the passageways help ensure uniform application of a vacuum between the impervious material and the workpiece.

As noted above, the coating 20 is formed of a silicone rubber release compound. The compound is of a type that is flexible, stretchable, and nonadherent to and not subject to damage or deterioration caused by contact with a large variety of workpieces. Since it is anticipated that a primary use for the breather material will be in an installation in which a fiber reinforced epoxy resin matrix composite material is being formed, the release compound forming the coating 20 is preferably one that is nonadherent to such an epoxy resin matrix and that is not subject to damage or deterioration caused by contact with such a matrix. An example of a release compound suitable for use with epoxy resins is the release compound sold by the Mosites Rubber Company, Inc. of Fortworth, Tex., under the name Mosites No. 14232-B silicone release agent.

The coating 20 on the surface 18 of the fabric 10 opposite the ribbed surface 16 need not necessarily be of any particular configuration. However, in most use situations it is highly preferable that the surface 22 of the coating 20 opposite the ribbed surface 16 of the fabric 10 be essentially flat and smooth. The advantage of such a flat and smooth surface 22 is that it maximizes the uniformity of the pressure applied by such surface 22 against a workpiece by providing a maximized contact surface 22. This maximized contact surface 22 is essentially flat and smooth except for the holes 24 in the coating 20. These holes 24 provide passageways for a vacuum to ensure that any entrapped air between the breather material 6 and the workpiece is removed by the vacuum.

The breather material of the invention may be used as a component of the sheet material of the invention or may be used as a separate layer in a vacuum bagging or similar operation. In such an operation, the easy-to-handle breather material 6 could, for example, be laid on the composite material lay-up to be compacted and placed inside the vacuum bag with the composite material. In a conventional vacuum bag compacting operation, it would generally not make any significant difference whether the breather material 6 was a separate piece or adhesively bonded to the impervious material forming the vacuum bag. Therefore, the special needs of a particular situation or a particular user would generally dictate whether or not the two materials are bonded together.

On the other hand, in an installation such as that shown in FIGS. 1-6 and described in detail in the above-cited copending application, it is a great advantage to have the breather material 6 bonded to an impervious material to form an integrated sheet material 2. The use of the material 2 makes it possible to compact each ply 90 of composite material in a single automated step of lowering a compacting bag 60. The bag 60 may be raised out of the way following the compacting to allow a tape head 52 to be lowered into place to lay another ply 90. The entire process is highly automated and efficient.

The sheet material 2 includes an adhesive 8 between the breather material 6 and the layer of impervious material 4 to bond the layers 4, 6 together. As illustrated in FIG. 8, the adhesive 8 is applied to the ribbed face 16 of the breather material 6 in an amount sufficient to firmly bond the ribbed face 16 to the impervious layer 4 but insufficient to block the passageways 26 formed by the holes 24 in the breather material 6 and the valleys between the ribs 14 of material 6. The impervious material 4 is flexible and stretchable to compliment the flexability and stretchability of the breather material 6 and provide an integrated sheet material 2 that is flexible and stretchable. A preferred material for the impervious layer 4 is a flexible, stretchable silicone rubber. An example of a suitable adhesive is the silicone adhesive GE RTV 133 manufactured by the General Electric Company.

The method of manufacturing the foraminous breather material 6 is illustrated in FIGS. 10-17. The foraminous fabric 10 is laid on a horizontal surface 32 such as a table top or the like. This surface 32 is of a material, such as FEP, that will not adhere to silicone rubber release compound. The ribbed major surface 16 of the fabric 10 is faced upwardly. See FIGS. 10 and 11. Liquid silicone rubber release compound is thinned with a volatile solvent. The amount of solvent used is sufficient to cause shrinkage of the compound of about 50% in volume upon drying of the compound. An example of a suitable thinning formula is one part trichlorethane solvent to one part of Mosites No. 14232-B release compound. The thinned compound is poured over the fabric 10 to form a puddle 34 of the compound that covers the fabric 10. See FIGS. 12 and 13. Excess compound is swept off the fabric 10 to make the top of the puddle 34 substantially flush with the top of the fabric 10. FIGS. 14 and 15 illustrate a wiper blade 36 being used to sweep the excess thinned compound off the fabric 10.

The puddle 34 of compound is left exposed to the air and is allowed to dry to form the coating 20 on the fabric 10. The compound shrinks as it dries. This shrinkage conforms the dried coating 20 to the ribbed configuration of the upwardly facing major surface 16 of the fabric 10 and allows holes 24 to form in the coating 20 where there are holes 12 in the fabric 10. FIGS. 16 and 17 illustrate the breather material 6 near the end of the drying process. Depending on the intended use for the breather material 6, in some situations it is preferable to repeat the puddling and drying steps to form a second coat of release compound on material 6.

In order to form the preferred embodiment of the breather material 6, the horizontal surface 32 is preferably essentially flat. The flatness of the horizontal surface 32 results in the formation of an essentially flat and smooth surface 22 of the breather material 6. This surface 22 forms adjacent to the horizontal surface 32 when the puddle 34 is allowed to dry and the compound shrinks. The holes 24 in the coating 20 extend all the way through the breather material 6 from the outwardly facing ribbed surface 16 to the downwardly facing surface 22, but the downwardly facing surface 22 is essentially flat and smooth disregarding these holes 24.

If it is desired to use the breather material 6 as a separate material, the process of manufacture is completed upon the drying of the release compound and the completion of any necessary trimming of the edges of the breather material 6. If it is desired to use the breather material 6 as a component in an integrated sheet material 2, upon drying of the release compound and trimming of the edges, the breather material 6 is bonded to a layer of impervious material 4. The ribbed major surface 16 of the breather material 6 is bonded to the impervious material 4. As described above, the bonding is carried out by applying an adhesive in an amount sufficient to create a firm bond but insufficient to block the passageways 26 formed by the ribbed configuration of the breather material 6 and the holes 12, 24 through the fabric 10 and the coating 20. The result is an integrated sheet material having passageways 26 that communicate with the holes 12, 24 in the foraminous breather material layer 6 and with edge portions of the integrated material 2.

Figure 19:
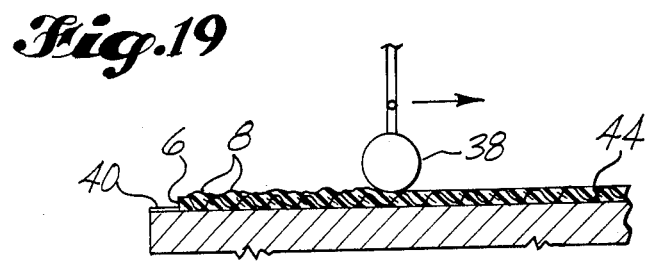
Figure 20:
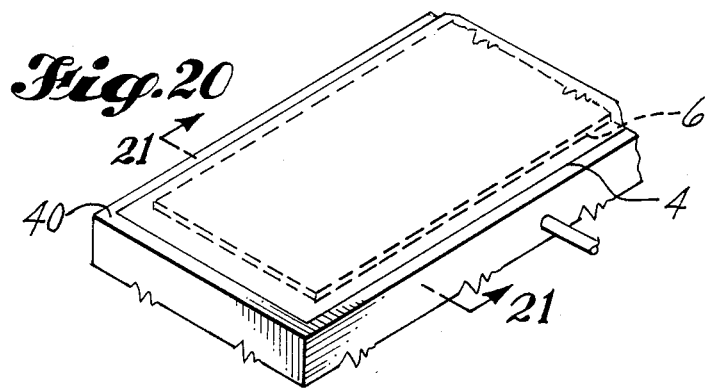
Figure 21:
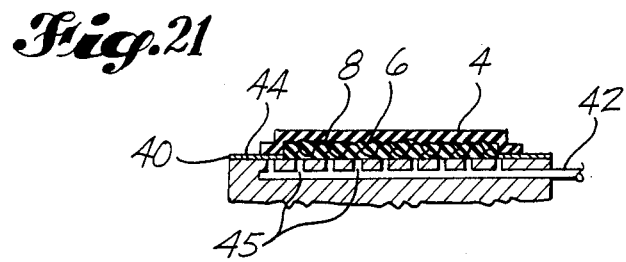

The preferred method for carrying out the bonding step is illustrated in FIGS. 18-21. The coated fabric forming the breather material 6 is positioned against an essentially flat surface 44, such as a table top. The periphery of this flat surface 44 is preferably provided with a plastic film 40 that is capable of sealingly engaging the impervious material 4. The breather material 6 is positioned inside the periphery with its ribbed major surface 16 facing outwardly from the flat surface 44. The adhesive 8 that is to be used to bond the layers 4, 6 together is applied to a cylindrical surface of an adhesive applying tool 38 resembling a rather large paint roller. The cylindrical surface of the roller 38 is then rolled across the outwardly facing ribbed surface 16 of the breather material 6 to transfer the adhesive 8 from the roller 38 to outer ridge portions 14 of the ribbed surface 16. The application of the adhesive 8 is illustrated in FIGS. 18 and 19. When the adhesive 8 has been applied, the sheet of impervious material 4 is positioned over the breather material 6 adjacent to the ribbed surface 16 and the adhesive 8. The ribbed surface 16 and the sheet 4 of impervious material are then pressed together to form a firm bond.

In the preferred embodiment of the method, the pressing together to form a firm bond is carried out by applying a vacuum. When the sheet of impervious material 4 is positioned over the brether material 6, the edges of the sheet 4 are brought into contact with the plastic film 40 on the periphery of the table surface 44. See FIG. 20. A vacuum is then applied through a plurality of vacuum ports 45 in table surface 44 and a vacuum hose 42 that communicates with ports 45. The edges of the sheet 4 sealingly engage the film 40 and the space between the sheet 4 and the surface 44 is evacuated to press the breather material 6 and the impervious material 4 together to form the desired firm bond. See FIG. 21. Preferably, the vacuum and sealing engagement are maintained to continue to press the breather material 6 and the impervious material 4 together for a period of time (about 8 to 24 hours at a pressure of 20 to 25 inches of mercury) sufficient to allow the adhesive 8 to cure. This helps to ensure that a firm bond is formed and completes the fabrication of the integrated sheet material 2. The material 2 is then ready for incorporation into an installation such as that shown in FIGS. 1-6.

Referring to FIGS. 1 and 2, the structure shown includes a tape laying head 52 that is carried by a gantry (not shown) in a known manner. The tape laying head 52 carries a roller 54 which presses on a piece of tape to urge the tape against a mandrel 56 and lay the tape on the mandrel 56. The structure also includes a frame 58 on which a bag 60 is mounted. The bag 60 is made from the preferred embodiment of the integrated sheet material 2 of the present invention.

The mandrel 56 has an upper surface portion that conforms to the desired shape of the stringer 50 to be formed. This upper surface of the mandrel 56 has a generally U-shaped cross section and includes a generally horizontal top web 62 and two essentially vertical side flanges 64, 66 extending downwardly from the side edges of the top web 62. These side flanges 64, 66 remain essentially vertical along the entire length of the mandrel 56. A bend line is defined along each top side edge of the mandrel 56 where the top web 62 meets one of the flanges 64, 66. Each of these bend lines is contoured to follow the desired contour of the finished stringer 50. The orientation of the top web 62 is generally horizontal but varies from the horizontal along the length of the mandrel 56 because of the contouring of the bend lines.

The flexible bag 60 may be inflated into a stretched condition. The frame 58 provides support for the bag 60 and maintains the elongated shape of the bag 60. Means (not shown) are provided for raising and lowering the bag 60 over the mandrel 56. The mandrel 56 carries a seal 68 that surrounds the perimeter of the upper surface portion of the mandrel 56 and that is sealingly engaged by the inflatable bag 60 when the bag 60 is lowered over the mandrel 56.

The structure shown in FIGS. 1-6 is also provided with means for evacuating the space between the inflatable bag 60 and the mandrel 56. The upper surface portion of the mandrel 56 has a number of vacuum ports 70 opening onto the upper surface portion within the seal 68. A vacuum line 72 extends through a lower portion of the mandrel 56 to communicate with the ports 70 via passageways 74. Line 72 extends laterally outwardly from the mandrel 56 and is hooked up to a vacuum device (not shown). The breather material portion 78 of the bag 60 is positioned and dimensioned to be within the seal 68 and cover the upper surface portion of the mandrel 56, including vacuum ports 70, when the bag 60 is fully lowered. (See FIG. 6) The material 78 contacts patches 76 of porous material bonded to the surface of the mandrel 56 over the openings of ports 70. Together, the material 78 and the patches 76 provide an air path for the evacuation process.

The operation of the installation shown in FIGS. 1-6 is as follows. A ply 90 of composite material tape is laid onto the top 62 of the mandrel 56 as shown in FIG. 1.

The bag 60 is then lowered down over the upper surface portion of the mandrel 56 to form the cantilevered ply 90 down over the mandrel 56 and compact the ply 90. FIG. 2 illustrates the bag 60 being lowered toward the mandrel 56. FIGS. 3 and 4 illustrate the bag 60 just completing its sealing engagement with the seal 68. FIG. 4 shows the sides of the ply 90 being formed down over the contoured bend lines of the mandrel 56. FIGS. 5 and 6 show the bag in a fully lowered condition and a vacuum being applied to compact the ply 90. FIG. 6 shows the apparatus near the end of the compaction process. When the ply 90 has been fully compacted, the bag 60 is raised away from the mandrel 56, another ply is laid, and the forming and compacting process is repeated.

In the forming and compacting of each ply of composite material tape, the stretchability of the integrated sheet material 2 of the present invention and the inflating of the bag 60 to put it in a stretched condition prevent the formation of wrinkles and bridging, and ensure that the ply 90 of tape is formed at each side edge of the top 62 of the mandrel 56 into a smooth contoured bend line. The result is the accurate forming of the ply 90 into the desired shape. In addition, the ply 90 is uniformly compacted by the excellent even contact provided by the sheet material 2 of the invention.

The installation shown in FIGS. 1-6 is, of course, but one example of an installation in which the material of the invention may be used to advantage. The illustrated installation is shown and relatively briefly described herein for the purpose of illustrating the use of the materials of the invention. It is of course to be understood that the materials could also be used to advantage in a wide variety of other installations.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. Breather material for use between an impervious layer and a workpiece in a system in which a vacuum is applied between said layer and said workpiece to cause said layer to exert substantially uniform pressure on said workpiece, said breather material comprising:
    a flexible fabric that has opposite major faces at least one of which is ribbed, and a plurality of holes extending therethrough between said faces, said holes being spaced over essentially the entire extent of said faces; said fabric being stretchable in its general plane in at least two directions, said directions being substantially perpendicular to each other; and
    a coating of silicone rubber release compound on said fabric covering at least the face opposite said ribbed face; said coating having a plurality of holes that extend therethrough and that generally coincide with said holes in the fabric, and any portions of said coating on said ribbed face substantially conforming to the configuration of said ribbed face, to provide passageways for a vacuum when the breather material is pressed between said impervious layer and said workpiece; and said release compound being flexible, stretchable, nonadherent to said workpiece, and not subject to damage or deterioration caused by contact with said workpiece.

2. Breather material as described in claim 1, in which, disregarding said holes in the coating, the outer surface of the coating on the face opposite said ribbed face is essentially flat and smooth to form a contact surface for pressing substantially uniformly against said workpiece.

3. Breather material as described in claim 1, in which the fabric includes polyester fibers arranged in a ribbed knit configuration.

4. Breather material as described in claim 3, in which, disregarding said holes in the coating, the outer surface of the coating on the face opposite said ribbed face is essentially flat and smooth to form a contact surface for pressing substantially uniformly against said workpiece.

5. Breather material as described in claim 1, in which said workpiece comprises composite material that includes an epoxy resin matrix, and said release compound is nonadherent to said matrix and is not subject to damage or deterioration caused by contact with said matrix.

6. Sheet material for exerting substantially uniform pressure on a workpiece when a vacuum is applied between said material and said workpiece, comprising:
    a layer of breather material including a flexible fabric that has opposite major faces at least one of which is ribbed, and a plurality of holes extending therethrough between said faces, said holes being spaced over essentially the entire extent of said faces, and said fabric being stretchable in its general plane in at least two directions, with said directions being substantially perpendicular to each other; and a coating of silicone rubber release compound on said fabric covering at least the face opposite said ribbed face; said coating having a plurality of holes that extend therethrough and that generally coincide with said holes in the fabric, and any portions of said coating on said ribbed face substantially conforming to the configuration of said ribbed face, to provide passageways for a vacuum; and said release compound being flexible, stretchable, nonadherent to said workpiece, and not subject to damage or deterioration caused by contact with said workpiece;
    a layer of flexible, stretchable impervious material adjacent to said ribbed face; and
    adhesive between said impervious material and said ribbed face in an amount sufficient to firmly bond said ribbed face to said impervious material but insufficient to block said passageways.

7. Sheet material as described in claim 6, in which the impervious material comprises flexible, stretchable silicone rubber.

8. Sheet material as described in claim 6, in which, disregarding said holes in the coating, the outer surface of the coating on the face opposite said ribbed face is essentially flat and smooth to form a contact surface for pressing substantially uniformly against said workpiece.

9. Sheet material as described in claim 6, in which the fabric includes polyester fibers arranged in a ribbed knit configuration.

10. Sheet material as described in claim 9, in which, disregarding said holes in the coating, the outer surface of the coating on the face opposite said ribbed face is essentially flat and smooth to form a contact surface for pressing substantially uniformly against said workpiece.

11. Sheet material as described in claim 6, in which said workpiece comprises composite material that includes an epoxy resin matrix, and said release compound is nonadherent to said matrix and is not subject to damage or deterioration caused by contact with said matrix.

12. A method of making foraminous sheet material having a ribbed major surface, said method comprising:
   laying a foraminous ribbed fabric on a horizontal surface of a material that will not adhere to silicone rubber release compound, and facing a ribbed major surface of said fabric upwardly;
   thinning liquid silicone rubber release compound with a volatile solvent in an amount sufficient to cause shrinkage of the compound of about 50% in volume upon drying of the compound;
   forming a puddle of the thinned compound that covers the fabric and is substantially flush with the top of the upwardly facing major surface of the fabric; and
   allowing the puddle of compound to dry to form a coating on the fabric, and allowing the compound to shrink as it dries to conform said coating to the ribbed configuration of the upwardly facing major surface and to allow holes through the coating to form where there are holes through the fabric.

13. A method as described in claim 12, in which the step of forming a puddle comprises pouring the thinned compound over the fabric to form a puddle of compound that covers the fabric, and sweeping excess compound off the fabric to make the top of the puddle substantially flush with the top of the fabric.

14. A method as described in claim 12, in which the step of laying a fabric on a horizontal surface comprises laying the fabric on an essentially flat horizontal surface, and in which the step of allowing the puddle to dry and allowing the compound to shrink includes allowing the coating on the downwardly facing major surface to conform to said horizontal surface to form, disregarding said holes through the coating, an essentially flat and smooth surface.

15. A method of making flexible, stretchable sheet material having an impervious layer, a foraminous layer, and pasageways between said layers, said passageways communicating with holes in the foraminous layer and with edge portions of said material, said method comprising:
   laying a flexible, stretchable foraminous ribbed fabric on a horizontal surface of a material that will not adhere to silicone rubber release compound, and facing a ribbed major surface of said fabric upwardly;
   thinning liquid silicone rubber release compound with a volatile solvent in an amount sufficient to cause shrinkage of the compound of about 50% in volume upon drying of the compound;
   forming a puddle of the thinned compound that covers the fabric and is substantially flush with the top of the upwardly facing major surface of the fabric;
   allowing the puddle of compound to dry to form a coating on the fabric, and allowing the compound to shrink as it dries to conform said coating to the ribbed configuration of the upwardly facing major surface and to allow holes through the coating to form where there are holes through the fabric; and
   then bonding said ribbed major surface to a sheet of flexible, stretchable impervious material by applying an adhesive in an amount sufficient to create a firm bond but insufficient to block passageways formed by said ribbed configuration and said holes through the fabric and the coating.

16. A method as described in claim 15, in which the step of forming a puddle comprises pouring the thinned compound over the fabric to form a puddle of compound that covers the fabric, and sweeping excess compound off the fabric to make the top of the puddle substantially flush with the top of the fabric.

17. A method as described in claim 15, in which the step of laying a fabric on a horizontal surface comprises laying the fabric on an essentially flat horizontal surface, and in which the step of allowing the puddle to dry and allowing the compound to shrink includes allowing the coating on the downwardly facing major surface to conform to said horizontal surface to form, disregarding said holes through the coating, an essentially flat and smooth surface.

18. A method as described in claim 15, in which the bonding step includes positioning the coated fabric against an essentially flat surface with said ribbed major surface facing outwardly from said flat surface, applying the adhesive to a cylindrical surface, following the cylindrical surface across the outwardly facing ribbed surface to transfer the adhesive from the cylindrical surface to outer ridge portions of said ribbed surface, positioning said sheet of impervious material adjacent to said ribbed surface and the adhesive thereon, and pressing said ribbed surface and said sheet of impervious material together to form said firm bond.

19. A method as described in claim 18, which further comprises providing peripheral portions of said flat surface with a plastic film; in which the step of positioning said sheet of impervious material includes bringing the edges of said sheet into contact with the film; and in which the step of pressing includes applying a vacuum between said sheet and said flat surface, and allowing the edges of said sheet to sealingly engage the film.

20. A method as described in claim 19, in which the step of pressing includes maintaining the vacuum and the sealing engagement between said sheet and the film for a period of time sufficient to allow the adhesive to cure.

21. Sheet material having a ribbed major surface, comprising:
   a fabric that has opposite major faces at least one of which is ribbed, and a plurality of holes extending therethrough between said faces; and
   a foraminous coating of silicone rubber release compound formed on the fabric by allowing the compound to dry and shrink, to conform to the configuration of said ribbed face and to form a plurality of holes extending through the coating and generally coinciding with the holes in the fabric.

22. Sheet material as described in claim 21, further comprising a layer of impervious material adjacent to said ribbed face, and adhesive between said impervious material and said ribbed face in an amount sufficient to firmly bond said ribbed face to said impervious material but insufficient to block passageways formed by the configuration of said ribbed face and said holes through the fabric and the coating.

* * * * *

UNITED STATES PATENT AND TRADEMARK OFFICE
CERTIFICATE OF CORRECTION

PATENT NO. : 4,548,859
DATED : October 22, 1985
INVENTOR(S) : William T. Kline and Robert F. Mittlestadt It is certified that error appears in the above-identified patent and that said Letters Patent are hereby corrected as shown below:

Column 5, line 23,   "materials"  should be   -- material --.
Column 6, line 40,   "in"  should be   -- to --.
Column 9, line 62,   "brether" should be   -- breather --.
Column 14, line 24,  "following"  should be   -- rolling --.

Signed and Sealed this

Tenth Day of June 1986

[SEAL]

Attest:

DONALD J. QUIGG

Attesting Officer   Commissioner of Patents and Trademarks